US012705265B2

(12) United States Patent
Vasseur et al.

(10) Patent No.: US 12,705,265 B2
(45) Date of Patent: Aug. 11, 2026

(54) COMPUTER NETWORK MONITORING AND CONTROL USING A FINE-TUNED LANGUAGE MODEL

(71) Applicant: Cisco Technology, Inc., San Jose, CA (US)

(72) Inventors: Jean-Philippe Vasseur, Combloux (FR); Grégory Mermoud, Venthône (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 164 days.

(21) Appl. No.: 18/244,530

(22) Filed: Sep. 11, 2023

(65) Prior Publication Data

US 2025/0086205 A1 Mar. 13, 2025

(51) Int. Cl.
*G06F 16/3329* (2025.01)
*G06F 40/253* (2020.01)

(52) U.S. Cl.
CPC ........ *G06F 16/3329* (2019.01); *G06F 40/253* (2020.01)

(58) Field of Classification Search
CPC ........................... G06F 16/3329; G06F 40/253
See application file for complete search history.

(56) References Cited

U.S. PATENT DOCUMENTS 10,482,182 B1 * 11/2019 Jankowski, Jr. ........ G06F 40/30
11,341,326 B2 5/2022 Wang et al.
11,620,515 B2 4/2023 Liu et al.
11,900,921 B1 * 2/2024 Gupta ..................... G10L 15/22
2018/0364975 A1 * 12/2018 Kwong ................... G06F 3/167
2019/0130251 A1 * 5/2019 Lao ................... G06F 16/90332
2021/0224660 A1 7/2021 Song et al.
2022/0012637 A1 1/2022 Rezazadegan Tavakoli et al.
2022/0335303 A1 10/2022 Haidar et al.
2024/0056361 A1 * 2/2024 Bai ..................... H04L 41/0803
2024/0137289 A1 * 4/2024 Wu ......................... H04L 43/08
2024/0319970 A1 * 9/2024 Watson ...................... G06F 8/35
2024/0354423 A1 * 10/2024 Mardikar .............. G06T 19/006
2024/0362093 A1 * 10/2024 Zhou ..................... G06F 16/243
2024/0362468 A1 * 10/2024 Lee ........................ G06N 3/047
2024/0428079 A1 * 12/2024 Chen ........................ G06N 3/08
2025/0005058 A1 * 1/2025 Khosla ................ G06F 16/3344
2025/0036375 A1 * 1/2025 Hsieh ........................ G06F 8/35
2025/0077551 A1 * 3/2025 Simaria ................... G06F 40/47

OTHER PUBLICATIONS

MIST WAN Assurance Overview, 2023, MIST (Year: 2023).*
"Knowledge distillation", online: https://en.wikipedia.org/wiki/Knowledge_distillation, accessed Sep. 11, 2023, 4 pages, Wikimedia Foundation, Inc.

* cited by examiner

*Primary Examiner* — Sonia L Gay
(74) *Attorney, Agent, or Firm* — Lee & Hayes, P.C.

(57) ABSTRACT

In one implementation, a device generates a response to user input using a first language model. The device determines that the response is an erroneous response. The device generates a resolution to the erroneous response using a teacher language model. The device updates the first language model using the resolution from the teacher language model.

20 Claims, 10 Drawing Sheets

COMPUTER NETWORK MONITORING AND CONTROL USING A FINE-TUNED LANGUAGE MODEL

TECHNICAL FIELD

The present disclosure relates generally to computer network monitoring and control using a fine-tuned language model.

BACKGROUND

The recent breakthroughs in large language models (LLMs), such as ChatGPT and GPT-4, represent new opportunities across a wide spectrum of industries. For instance, the ability of these models to follow instructions allows for interactions with tools (also called plugins), such as searching the web, executing code, etc.

Although their progress is impressive, LLMs remain extremely difficult to use in practice, for a variety of reasons. First, they still exhibit flaws in their functioning (e.g., hallucinations, over-confidence, biases, mistakes), which are often extremely difficult to understand and troubleshoot. Second, the fundamental driver of performance has been the size of the model, which is a function of the number of parameters of the model. For instance, GPT-3.5 uses approximately 175 billion parameters, FLAN-PaLM uses 540 billion parameters, and some estimates for GPT-4 place its number of parameters as high as one trillion.

Because model size is directly responsible for computational costs, both in terms of compute and memory, as well as energy consumption, these so-called large language models have come at a hefty price for both training and inference, making them impractical for many applications. While it may be possible to use smaller, less capable language models for certain purposes, such models can also suffer from poor performance and can be error prone.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1A:
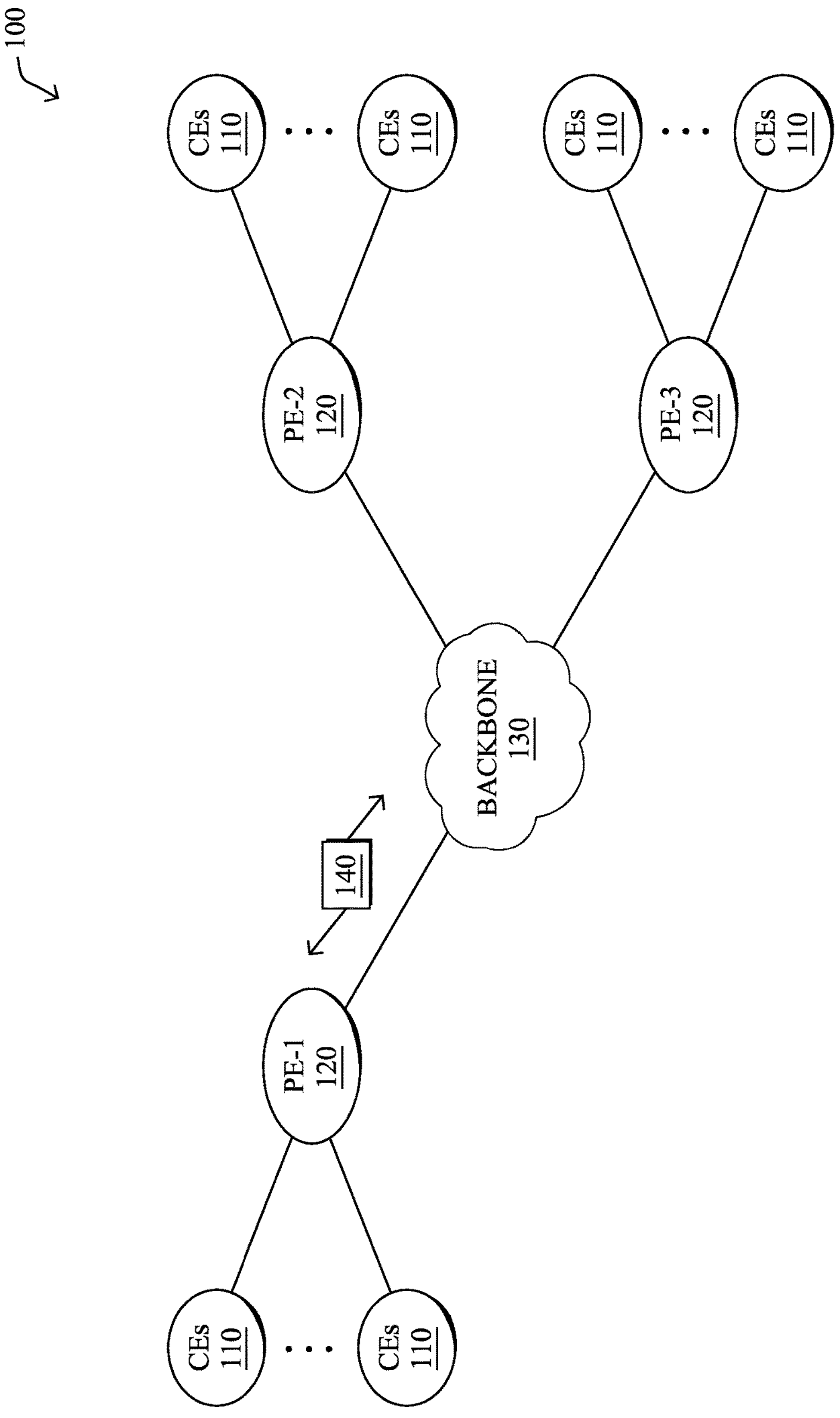
FIGS. 1A-1B illustrate an example communication network.

According to one or more implementations of the disclosure, a device generates a response to user input using a first language model. The device determines that the response is an erroneous response. The device generates a resolution to the erroneous response using a teacher language model. The device updates the first language model using the resolution from the teacher language model.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
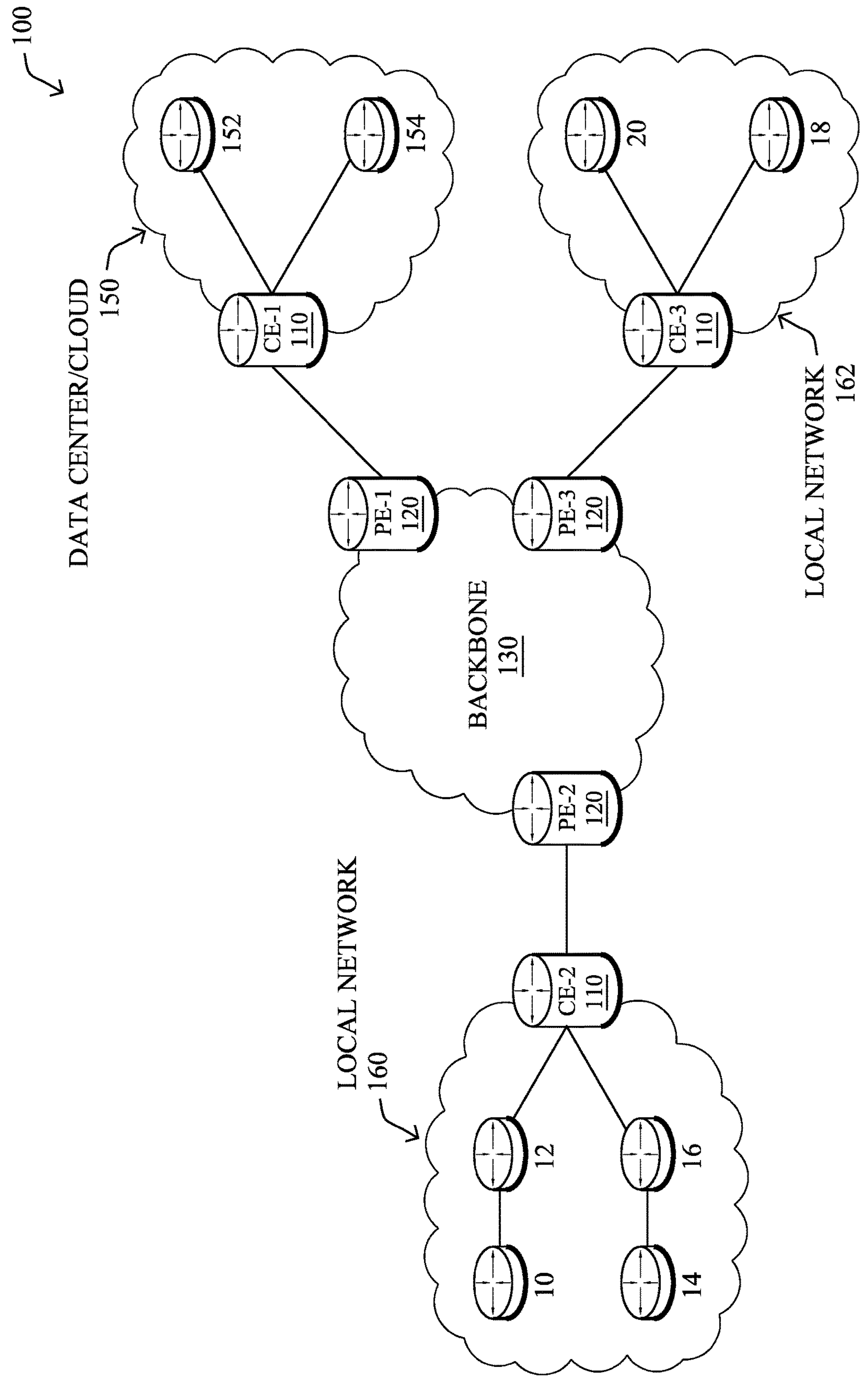

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
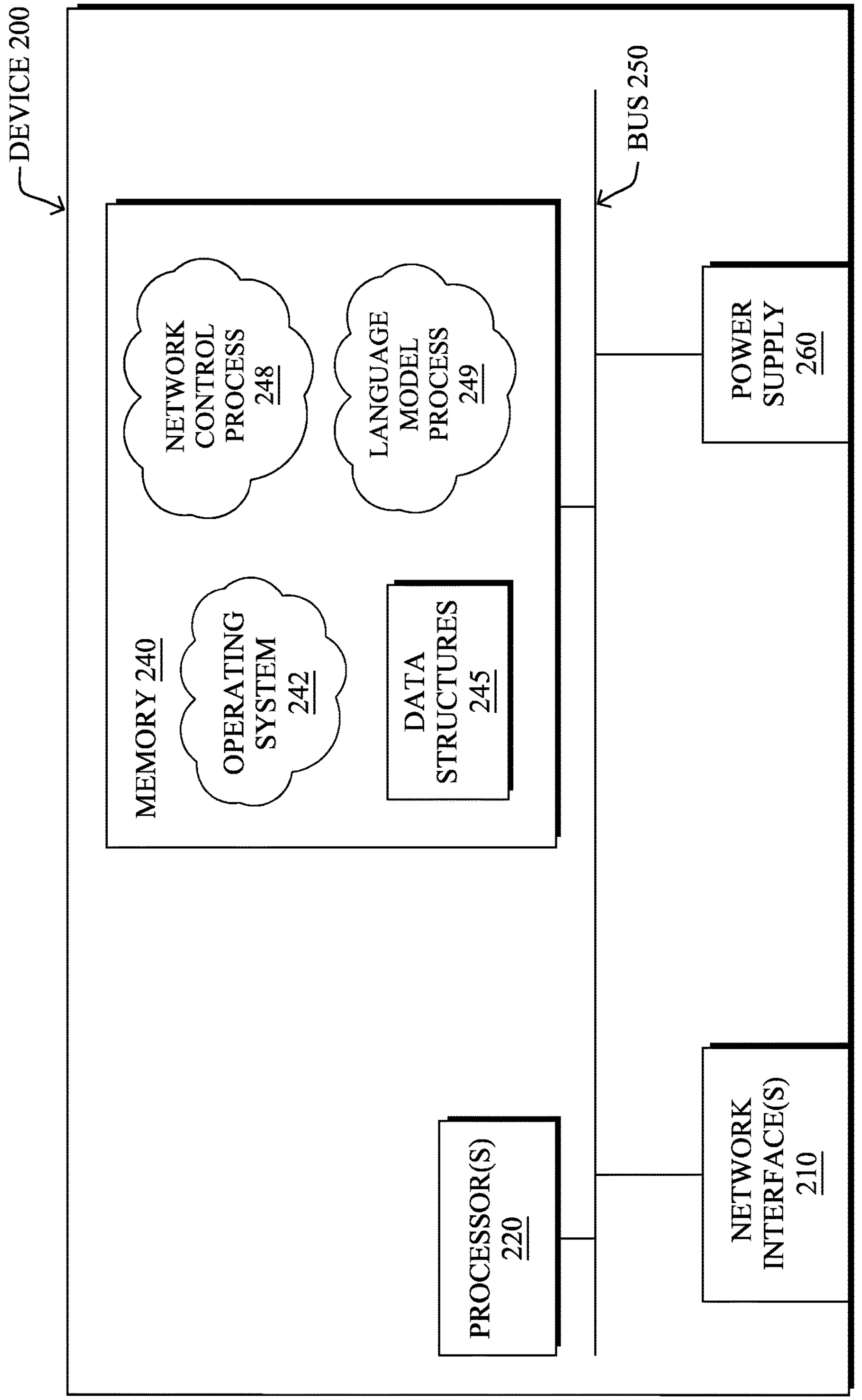
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a language model process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or language model process 249 may include computer executable instructions that, when executed by processor(s) 220, cause device 200 to perform the techniques described herein. To do so, in some implementations, network control process 248 and/or language model process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or language model process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or language model process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or language model process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
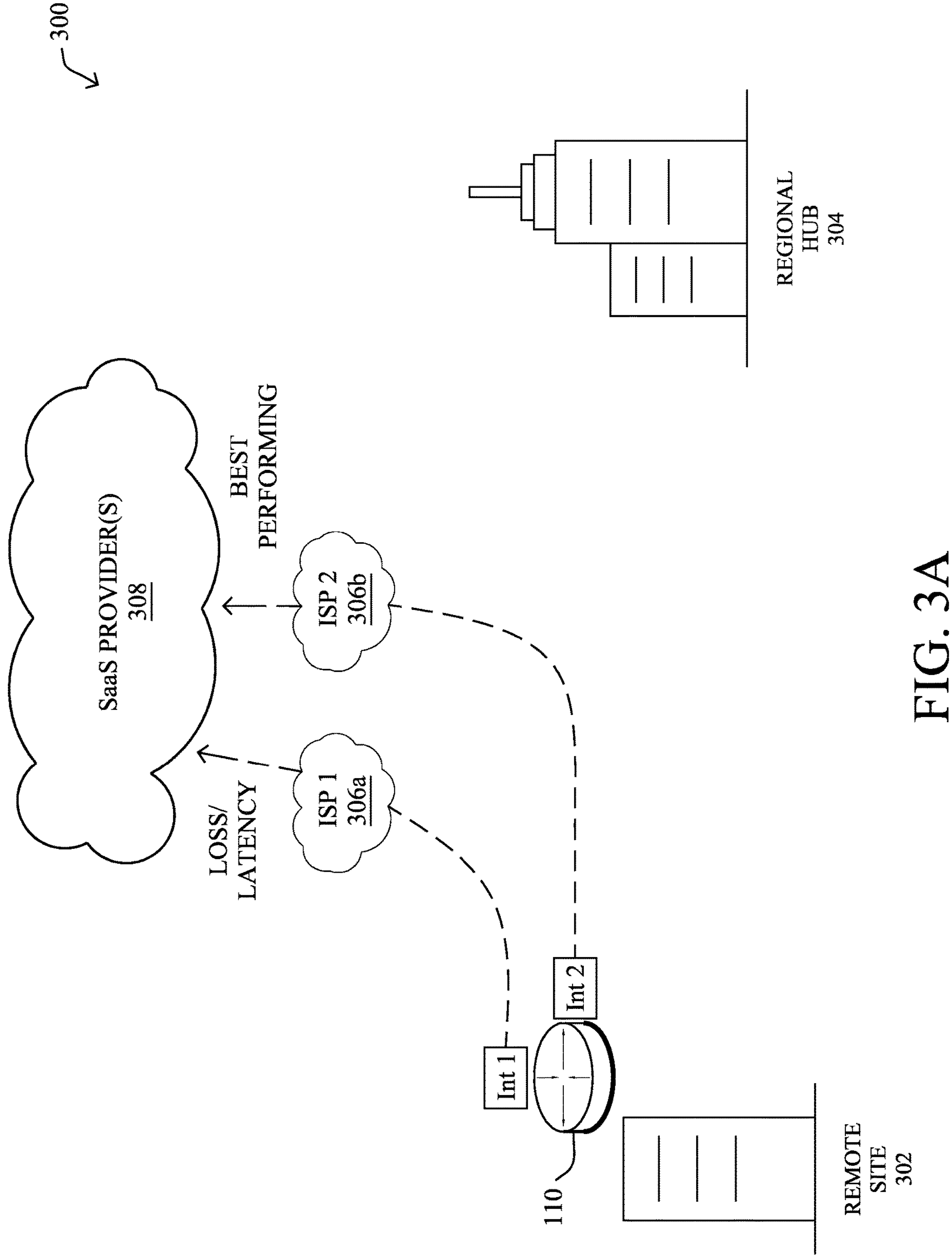
FIGS. 3A-3B illustrate example network deployments.
Figure 3B:
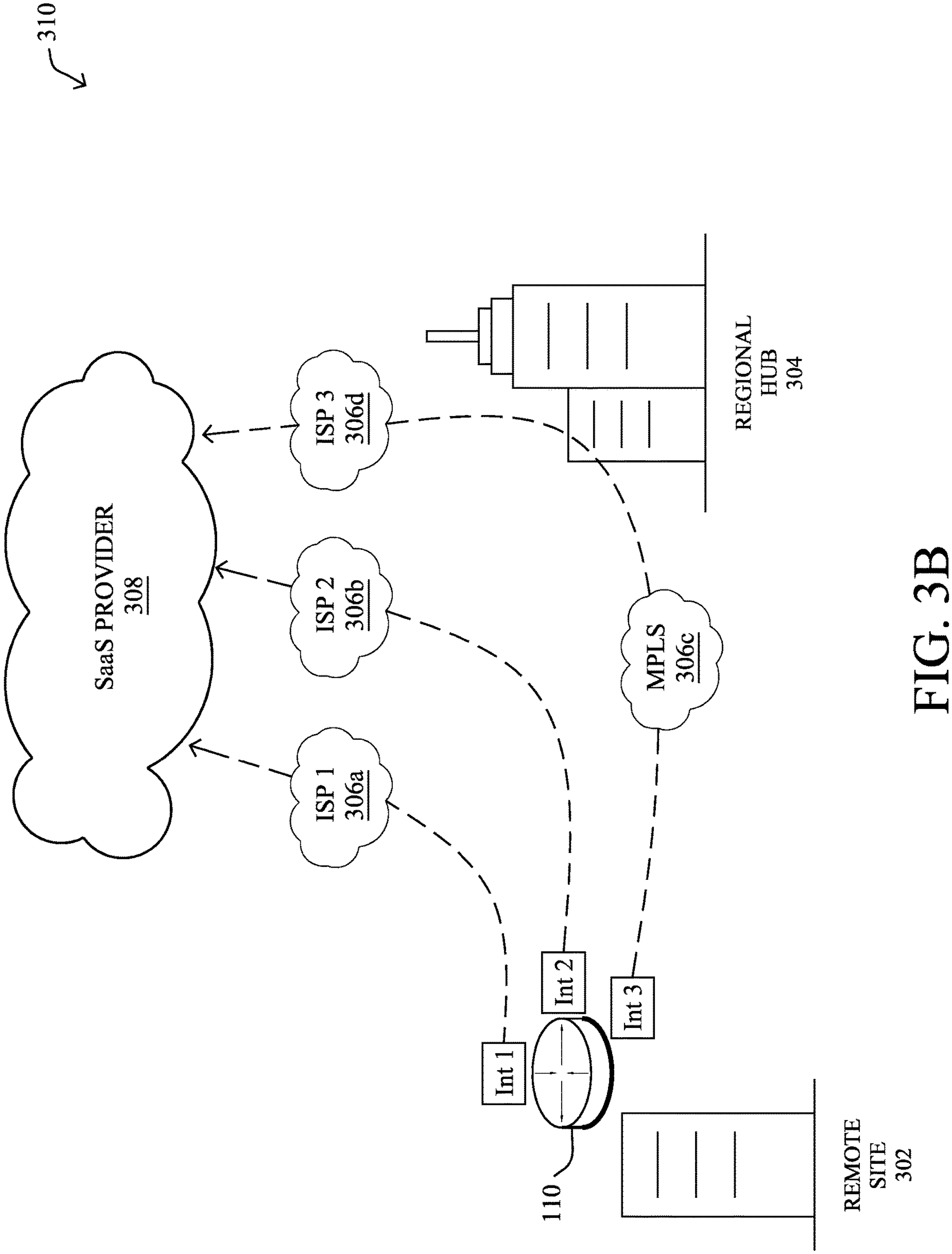

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider (s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
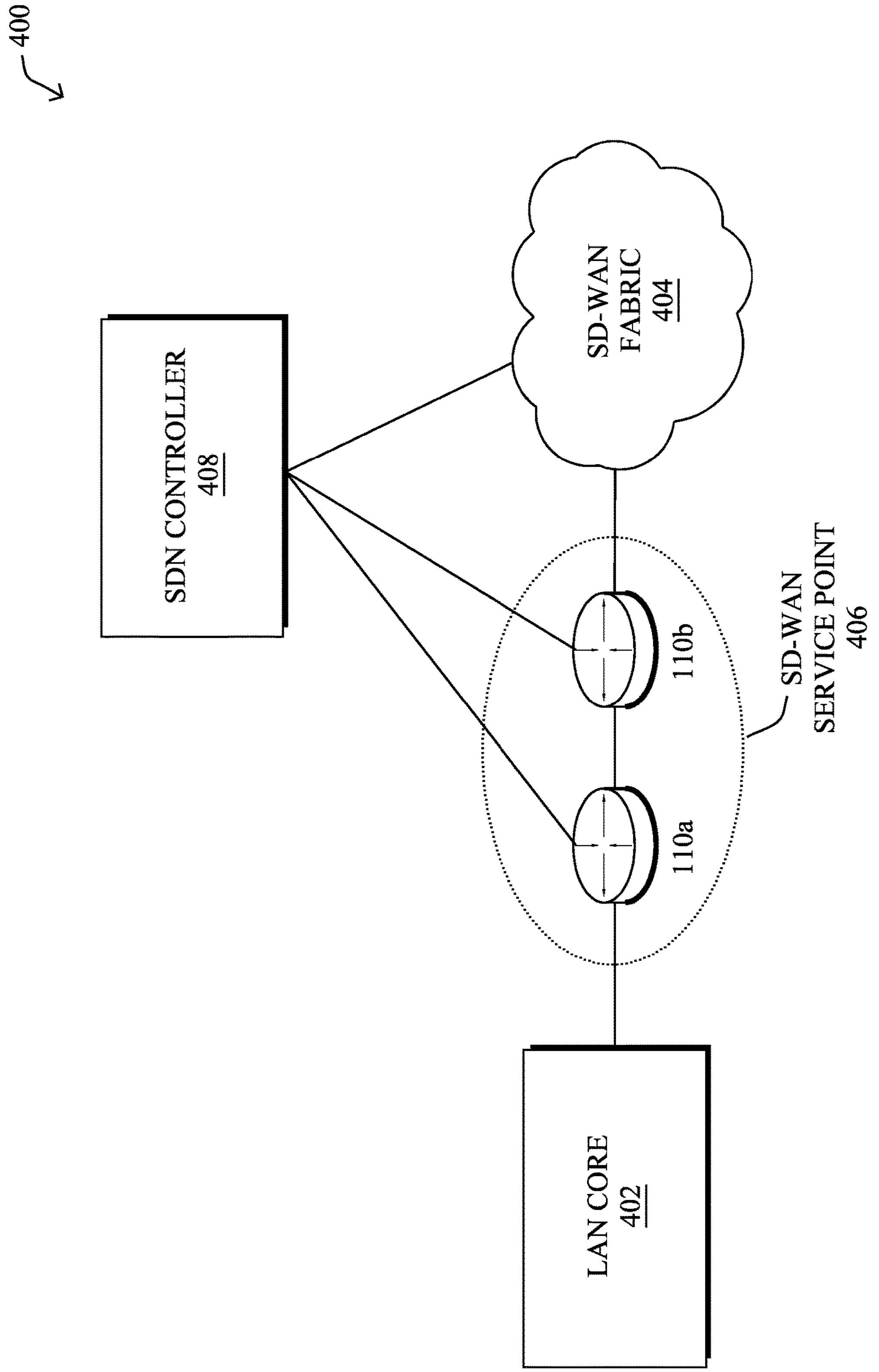
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g. security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., NIPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

- New in-house applications being deployed;
- New SaaS applications being deployed everywhere in the network, hosted by a number of different cloud providers;
- Internet, NIPLS, LTE transports providing highly varying performance characteristics, across time and regions;
- SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, the recent breakthroughs in large language models (LLMs), such as ChatGPT and GPT-4, represent new opportunities across a wide spectrum of industries. For instance, the ability of these models to follow instructions allows for interactions with tools (also called plugins), such as searching the web, executing code, etc. In the context of computer networking, this means that language models could be used to perform monitoring and/or control tasks, such as those described above.

Although their progress is impressive, LLMs remain extremely difficult to use in practice, for a variety of reasons. First, they still exhibit flaws in their functioning (e.g., hallucinations, over-confidence, biases, mistakes), which are often extremely difficult to understand and troubleshoot. Second, the fundamental driver of performance has been the size of the model, which is a function of the number of parameters of the model. For instance, GPT-3.5 uses approximately 175 billion parameters, FLAN-PaLM uses 540 billion parameters, and some estimates for GPT-4 place its number of parameters as high as one trillion.

Because model size is directly responsible for computational costs, both in terms of compute and memory, as well as energy consumption, these so—called large language models have come at a hefty price for both training and inference, making them impractical for many applications. While it may be possible to use smaller, less capable language models for certain purposes, such models can also suffer from poor performance and can be error prone.

Computer Network Monitoring and Control Using a Fine-Tuned Language Model

The techniques introduced herein allow for a "smaller" language model to learn from a larger language model (e.g., an LLM), whereby the larger model is only used on a subset of the queries to the smaller model that were unsuccessful/erroneous. In some aspects, this selective knowledge distillation allows the larger model to teach the smaller s model to correct its past mistakes, thereby improving its performance over time.

Illustratively, the techniques described herein may be performed by hardware, software, and/or firmware, such as in accordance with language model process 249, which may include computer executable instructions executed by the processor 220 (or independent processor of interfaces 210) to perform functions relating to the techniques described herein, such as in conjunction with network control process 248.

Specifically, according to various implementations, a device generates a response to user input using a first language model. The device determines that the response is an erroneous response. The device generates a resolution to the erroneous response using a teacher language model. The device updates the first language model using the is resolution from the teacher language model.

Figure 5:
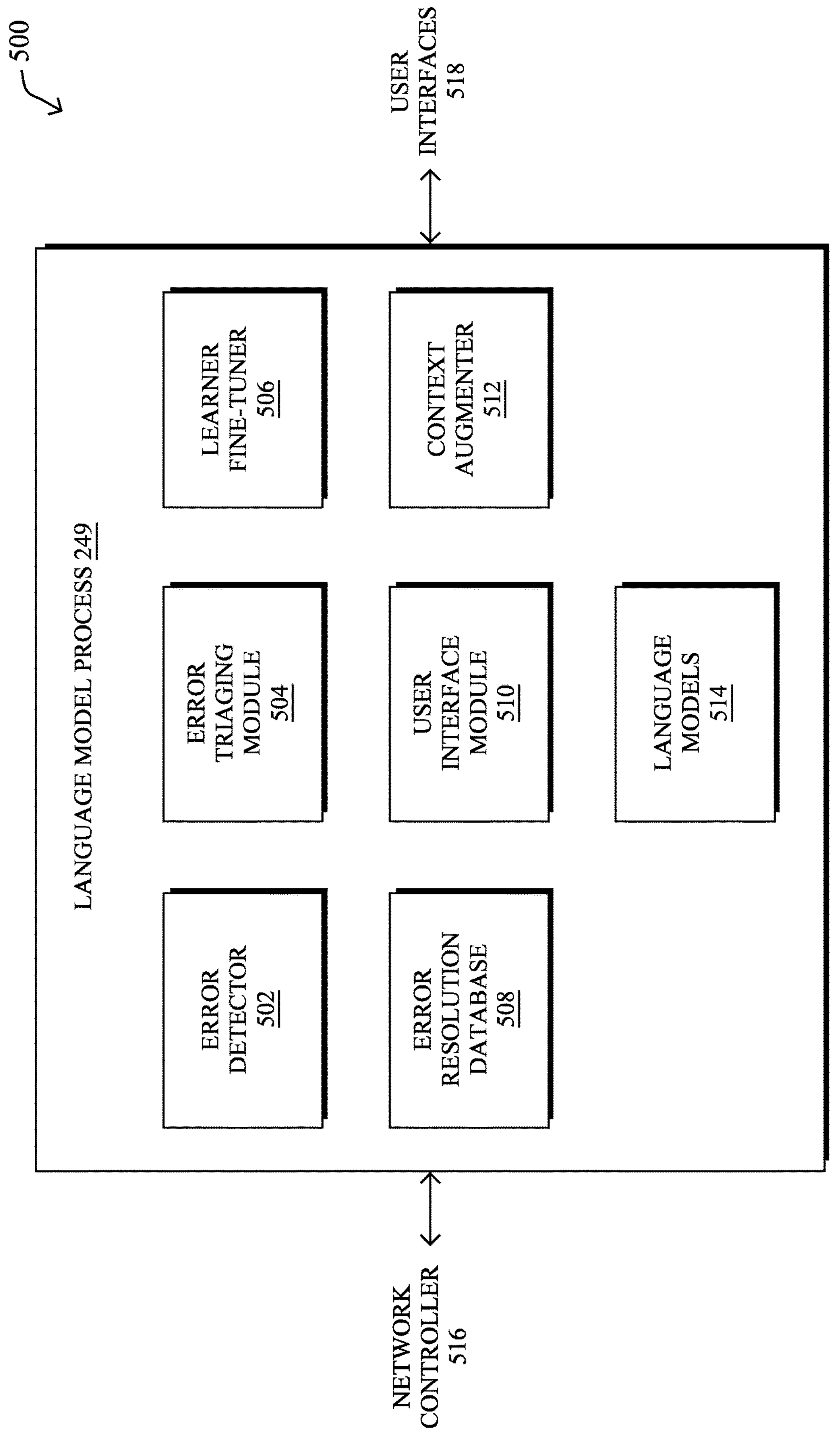
FIG. 5 illustrates an example architecture for using knowledge distillation to fine tune a language model.

Operationally, FIG. 5 illustrates an example architecture 500 for using generative models to create network configurations through natural language prompts, according to various implementations. At the core of architecture 500 is language model process 249, which may be executed by a controller for a network or another device in communication therewith. For instance, language model process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, language model process 249 may interface with a network controller 516, either locally or via a network (e.g., via one or more APIs, etc.).

As shown, language model process 249 may include any or all of the following components: an error detector 502, an error triaging module 504, a learner fine-tuner 506, an error resolution database 508, a user interface module 510, a context augmenter 512, and/or a set of language models 514. As would be appreciated, the functionalities of these components may be combined or omitted, as desired. In addition, these components may be implemented on a singular device or in a distributed manner, in which case the combination of executing devices can be viewed as their own singular is device for purposes of executing language model process 249.

According to various implementations, language models 514 may include two types of language models:

1. Any number of "learner" language models—in general, these models may be smaller, more specialized language models that have been trained to perform specific tasks, such as those related to monitoring or controlling the behavior of a computer network.
2. At least one primary, "teacher" language model—this model may take the form of a language model that is larger than that of the learner model(s). For instance, such a model may be an LLM or other language model capable of performing any or all of the tasks of the learner models.

By way of example, the learner model(s) in language models 514 may be configured to perform any or all of the following tasks:

- Generating configurations for networking elements, such as routers, switches, controllers, etc.
- Generating code for execution, such as Python code, Java code, or the like.
- Generating charts and/or plots based on networking telemetry, such as via Plotly, Matplotlib, or the like.
- Generating command line interface (CLI) commands to perform various tasks.
- Performing packet analysis of a packet trace from a network (e.g., from WireShark or the like).
- Performing an application programming interface (API) query/call.
- Etc.

Note that language models 514 may take the form of any variety of existing or custom forms of language models including, but not limited to, GPT-3.5, GPT-4, LLaMA, FLAN-PaLM, T5, GPT-J, and the like.

In various instances, user interface module 510 may allow any number of users to is interact with language model process 249 via one or more user interfaces 518. For instance, user interface module 510 may allow a user to provide user input, such as requests for CLI commands, packet analysis, etc., in natural language format for input to language models 514. In addition, user interface module 510 may also provide any results of such requests back to user interfaces 518 for review.

Figure 6:
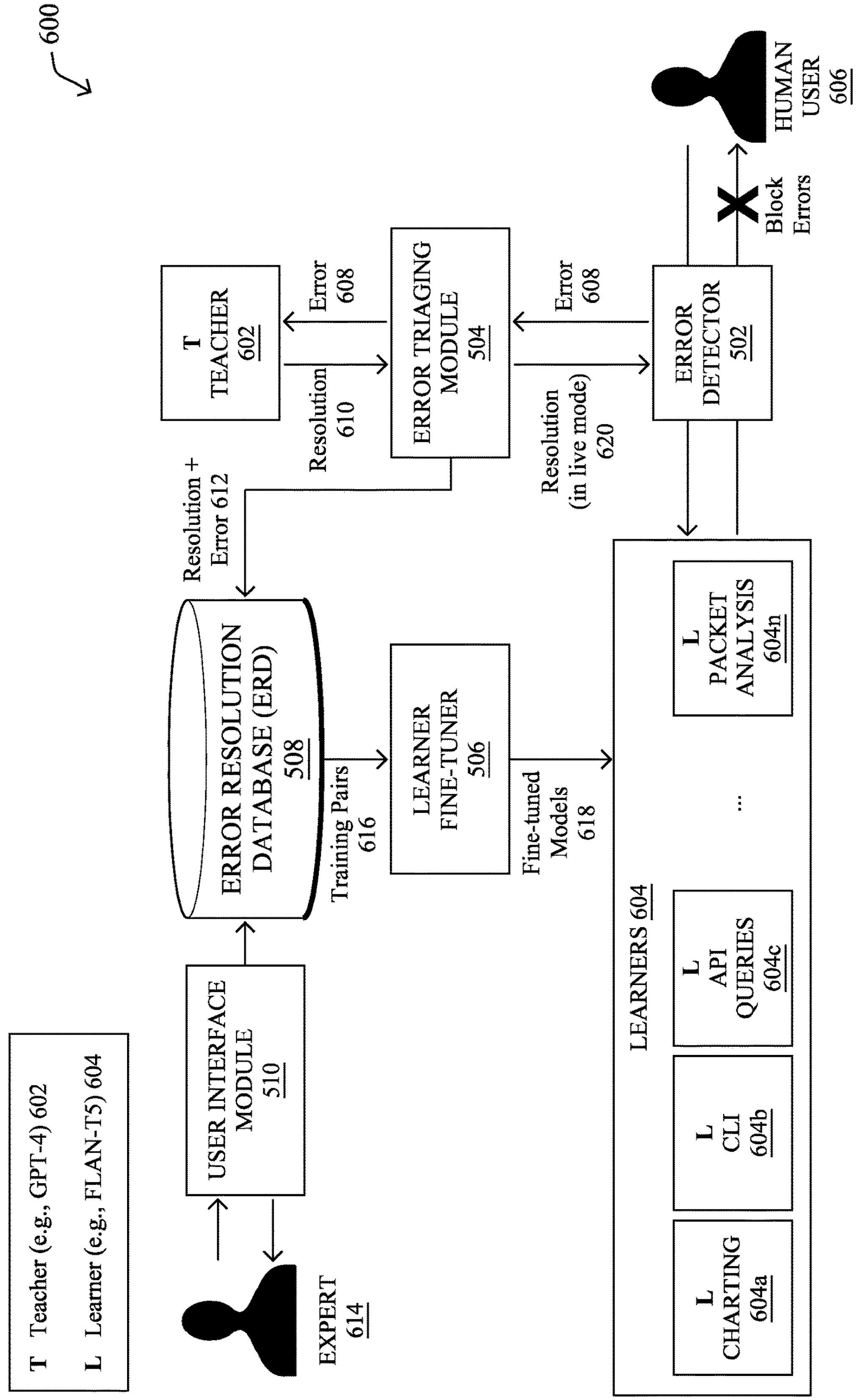
FIG. 6 illustrates an example of fine-tuning a language model using the architecture of FIG. 5.

FIG. 6 illustrates an example 600 of fine-tuning a language model using the architecture of FIG. 5, in various implementations. As shown, assume that language models 514 include a teacher model 602 (e.g., an LLM such as GPT-4) and a set of leaner models 604 (e.g., FLAN-T5 or the like). For instance, learner models 604 may include a first through nth leaner model, each of which may be trained to perform a different task. For example, leaner model 604*a* may perform charting, while learner model 604*b* may perform CLI command generation, learner model 604*c* may perform API queries, etc., while learner model 604*n* performs packet analysis.

In various implementations, error detector 502 may be responsible for identifying erroneous responses by any of learner models 604. More specifically, assume that a human user 606 operates a user interface (e.g., a user interface 518 in FIG. 5) to provide user input to one of the learner models 604. In such a case, the system may use the appropriate learner model from among learner models 604 to process the request of human user 606. In turn, error detector 502 may assess the response from that language model, to determine whether the response is an erroneous response. To do so, multiple options are possible, depending on the specific task for which the model was trained to perform. For instance:

- When the learner model produces code in a broad sense (e.g., Python, CLI, bash), error detector 502 could identify errors by executing the code and catching exceptions (e.g., syntax error, incorrect parameters, etc.). Even when no explicit error is raised, error detector 502 could also check whether the outcome is correct (e.g., in the case of a CLI command, running a validation is that the network is still healthy).
- When the learner model answers questions, errors are often more challenging to detect automatically. In such cases, error detector 502 could still rely on feedback from an end user, such as human user 606, by asking the user to rate the provided answer (e.g., via a thumb up or thumb down selection, rating the answer on a scale of 0-5 stars, etc.). In some implementations, error detector 502 could even rely on a dataset of trusted question-answer pairs that have been confirmed to be true.
- Etc.

In some instances, error detector 502 could even take the form of another language model, either using an LLM with few-shot learning or a smaller model, which is itself fine-tuned through distillation or classical supervised learning.

Regardless of the exact implementation, error detector 502 takes as input the response of each of learner models 604 and decides whether to flag that response as correct or incorrect/erroneous. In the case of a correct response, error detector 502 may allow that response to continue along its chain, such as by providing the response back to the user interface associated with human user 606, allowing the response from the learner model to influence the network or other associated system, or the like.

In the case of error detector 502 determining that a response is erroneous, though, error detector 502 may report the error 608 to error triaging module 504 for further processing. In some implementations, error detector 502 may also block the erroneous response from being presented to human user 606, as well.

In general, error triaging module 504 may operate in one of two different modes with respect to error 608:

1. Live resolution: in this case, error triaging module 504 may query teacher model 602 based on error 608, to obtain a resolution 610. In turn, the system may return the resolution 610 back to the user interface associated with human user 606 and/or any other mechanism that relies on the responses of learner models 604. For instance, in the is case of error 608 being an erroneous CLI command that uses incorrect syntax, resolution 620 may take the form of a corrected CLI command that uses the correct syntax for the target networking entity.
2. Offline resolution: in this case, error triaging module 504 may store error 608 for future resolution by teacher model 602 at a later time (e.g., at night, over the weekend, etc.). When this happens, it means that the original chain cannot continue and, in some cases, the system may notify human user 606 that an error has occurred.

The decision by error triaging module 504 between live and offline resolution depends on different factors, including the criticality of the user request (which can be determined by the user themselves or by their role in the organization), the current load and quotas for teacher queries to teacher model 602 (e.g., one may switch to offline resolution when the teacher model is too slow to respond or being rate-limited), or the like.

Regardless of the mode of resolution, error triaging module 504 may also store error 608 and its corresponding resolution 620 as a pair 612 in error resolution database 508. This allows the system to track errors over time and construct a record of their resolutions for both reporting purposes, as well as for purposes of fine-tuning learner models 604.

Learner fine-tuner 506 may retrieve training pairs 616 (e.g., pairs of errors and resolutions) from error resolution database 508 and perform some fine-tuning of the target learner model in learner models 604 on these resolutions. Ideally, learner fine-tuner 506 is fully automated and may run periodically without any supervision. In practice, there may also be some level of human supervision of the fine-tuning by an expert 614, such as a data scientist, machine learning engineer, or the like, via user interface module 510, to ensure that each of the learner models 604 executes smoothly. The outcome of this the fine-tuning by learner fine-tuner 506 may be a set of fine-tuned models 618 that are updated forms of learner models 604, using their same architectures is but different parameter values.

In some instances, learner fine-tuner 506 may simply replace older models amongst learner models 604 with their most recent set of fine-tuned models 618, indiscriminately. However, in more sophisticated implementations, learner fine-tuner 506 may perform A/B testing of both models (or more) to validate whether the fine-tuning has not introduced any biases and/or reduced the performance of the model on previously successful queries.

Optionally, error detector 502 may also include its own set of learner models and the same strategy could be used to improve the error detection for a given task performed by teacher model 602 (e.g., CLI command generation, etc.) than to improve the task itself. Two strategies are possible to detect such "meta errors":

1. User feedback can be an indication that an error has been missed. For instance, if error detector 502 has flagged a response as correct, yet human user 606 flags it as incorrect, this could serve as an example to be distilled.
2. Random sampling of responses can be performed and double-checked by teacher model 602.

In both cases, this brings about a virtuous circle whereby the error detection by error detector 502 improves, in turn improving the learner models 604.

In some implementations, user interface module 510 may allow expert 614 to inspect error resolution database 508, along with the resolutions, such as resolution 610, generated by teacher model 602. Indeed, even with a teacher model such as GPT-4, there are situations where the resolutions may still be incorrect. Those could then be either discarded or modified by expert 614 via user interface module 510, so that they do not pollute the fine-tuning dataset. In some instances, the system could also use such feedback from expert 614 to fine the teacher model 602 itself, e.g., by using its dedicated APIs.

Optionally, the system may also include context augmenter 512, as shown previously in FIG. 5, whose role it is to use in-context learning to boost the performance is of learner models 604 when fine-tuning is not possible and/or during the interval between the first occurrence of an error and the first time the model as seen it in its training data.

Figure 7:
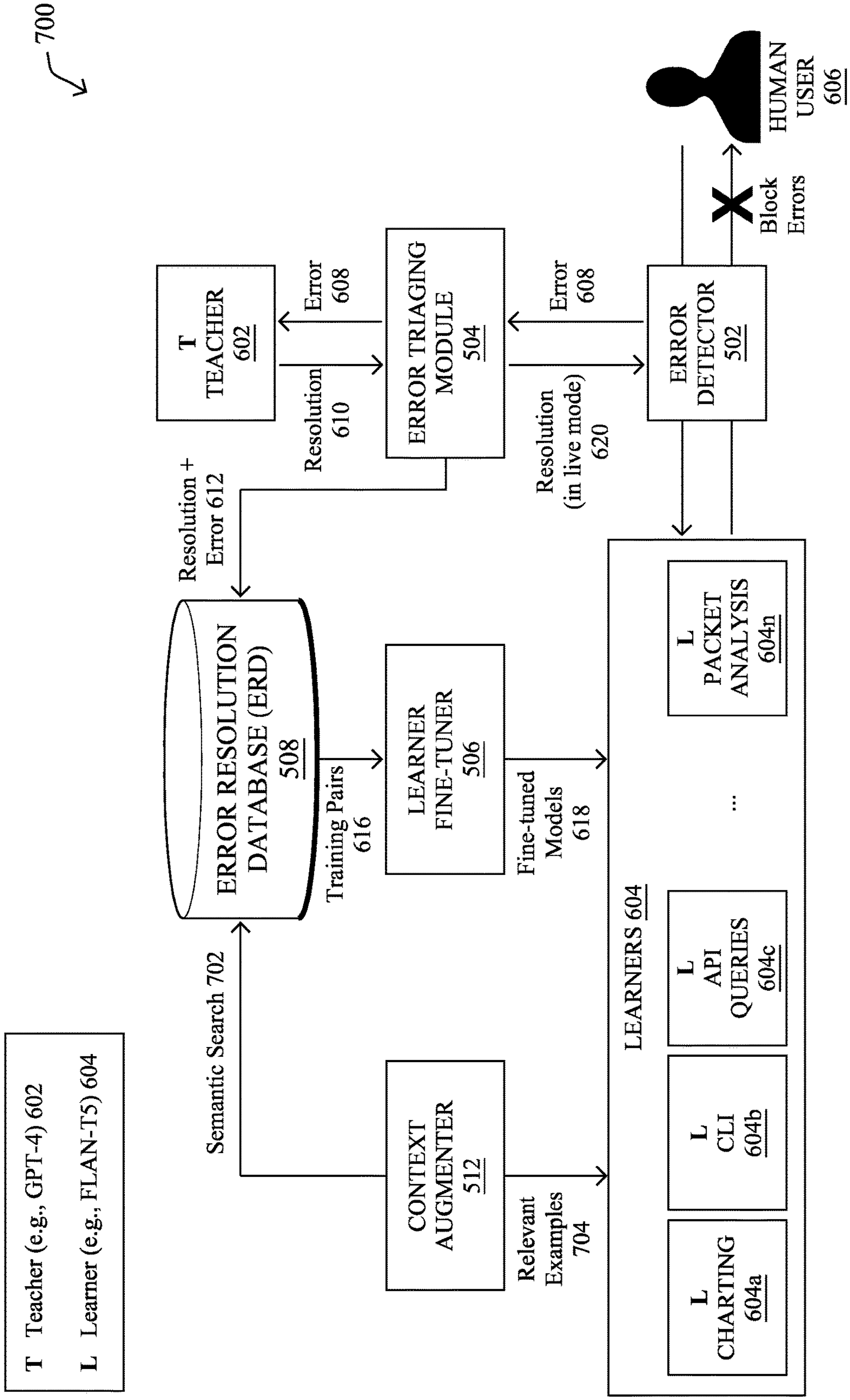
FIG. 7 illustrates an example of fine-tuning a language model using the architecture of FIG. 5 with augmented contexts.

FIG. 7 illustrates an example of fine-tuning a language model using the architecture of FIG. 5 with augmented contexts by context augmenter 512, in further implementations. As shown, context augmenter 512 may use in-context learning to boost the performance of learner models 604 with or without fine-tuning by retrieving relevant examples of resolutions by teacher model 602 that are found in error resolution database 508. Indeed, in many realistic settings, re-training may occur only on a daily or weekly basis: without the CAC, resolutions are not available to the learners for up to one re-training period.

To do so, as shown, context augmenter 512 may use semantic search 702, such as by retrieving the nearest neighbors of a query in the space of embeddings of some encoder model (which may or may not be the same as the teacher or learner). Of course, for purposes of illustration, user interface module 510 is omitted from FIG. 7, but its functionality could still be used in conjunction with context augmenter 512, such as by asking an expert to inspect and amend error resolution database 508 as needed.

Figure 8:
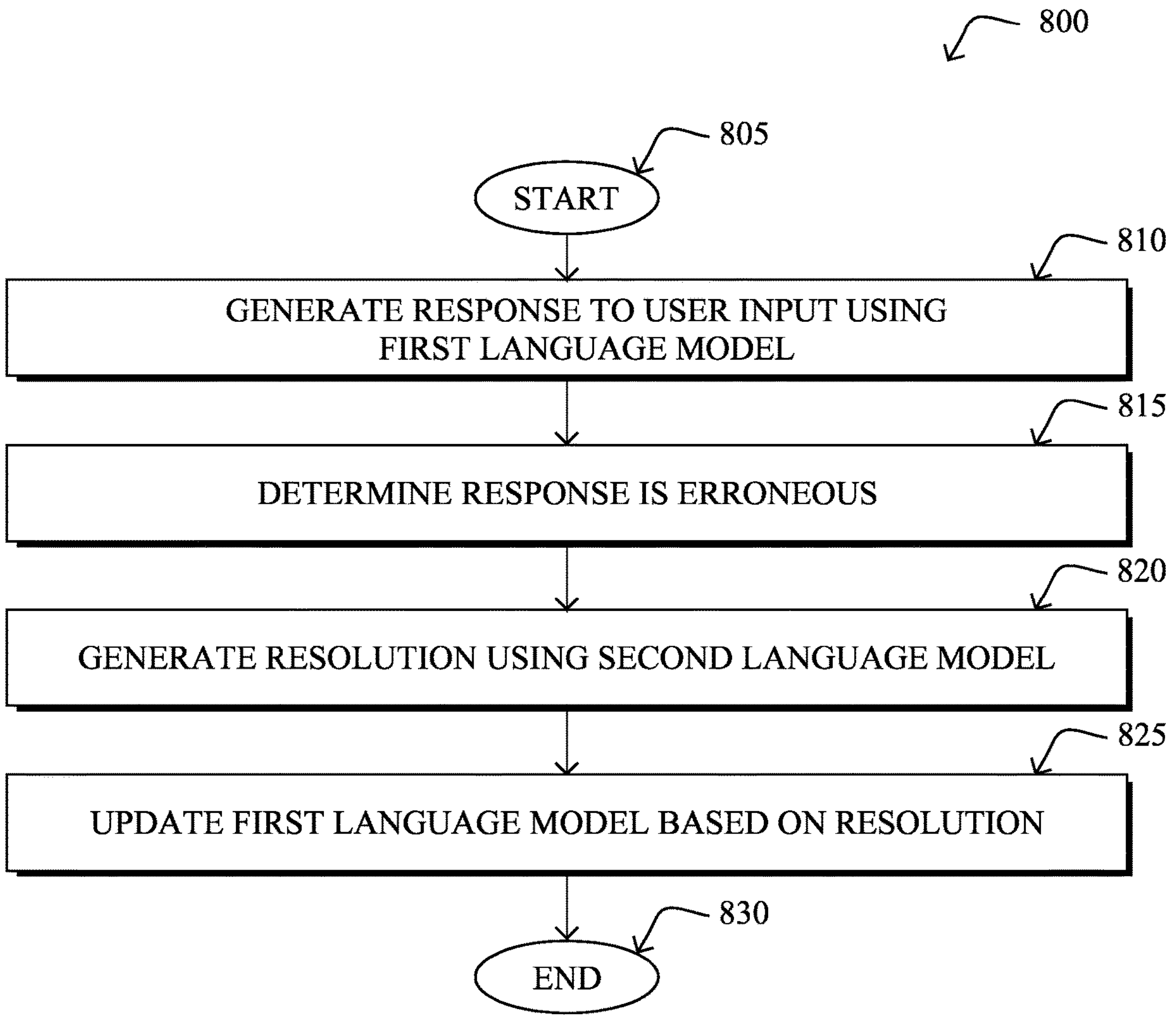
FIG. 8 illustrates an example simplified procedure for fine-tuning a language model.

FIG. 8 illustrates an example simplified procedure 800 (e.g., a method) for fine-tuning a language model, in accordance with one or more implementations described herein. For example, a non-generic, specifically configured device (e.g., device 200), such as a router, firewall, controller for a network (e.g., an SDN controller or other device in communication therewith), server, or the like, may perform procedure 800 by executing stored instructions (e.g., language model process 249 and/or network control process 248). The procedure 800 may start at step 805, and continues to step 810, where, as described in greater detail above, the device may generate a response to user input using a first language model. In some implementations, the response comprises a chart or plot of a network generated by the first language model based on networking telemetry from that network. In further implementations, the response comprises a command line interface (CLI) command for a networking element in a network. In another implementation, the response comprises an analysis of a packet trace from a network. In a further implementation, the response comprises an application programming interface (API) query. In additional cases, the first language model is configured to perform a monitoring or control action in a computer network.

At step 815, as detailed above, the device may determine that the response is an erroneous response. In some implementations, the device may also block the first language model from providing the erroneous response to a user interface associated with the user input. In various implementations, the device may determine that the response is an erroneous response by detecting a syntax error or incorrect parameter within the response.

At step 820, the device may generate a resolution to the erroneous response using a teacher language model. In various implementations, the teacher language model is larger in size than that of the first language model. In one implementation, the device may do so in part by receiving feedback from an expert regarding the resolution.

At step 825, as detailed above, the device may update the first language model using the resolution from the teacher language model. In some cases, the device may do so offline, such as at predetermined times (e.g., nightly, weekly, etc.). In other cases, the device may do so in an online manner, continually fine-tuning the first language model over time. In one implementation, the device may also triage erroneous responses by the first language model, to select whether to perform an online update of the model or an offline update.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for computer network monitoring and control using a fine-tuned language model, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:

generating, by a device, a response to user input using a first language model;

determining, by the device, that the response is an erroneous response;

making, by the device, a determination whether to delay querying a teacher language model regarding the erroneous response until after handling of the user input has completed;

querying, by the device and after handling of the user input has completed when the determination is to delay, the teacher language model based on the erroneous response in order to obtain a resolution to the erroneous response;

generating, by the device and based on an output from querying the teacher language model regarding the erroneous response, a resolution to the erroneous response including a corrected version of the erroneous response; and updating, by the device, the first language model using the resolution from the teacher language model.

2. The method as in claim 1, further comprising:

blocking, by the device, the first language model from providing the erroneous response to a user interface associated with the user input.

3. The method as in claim 1, wherein determining that the response is an erroneous response comprises:

detecting a syntax error or incorrect parameter within the response.

4. The method as in claim 1, wherein generating the resolution to the erroneous response using the teacher language model comprises:

receiving, at the device, feedback from an expert regarding the resolution.

5. The method as in claim 1, wherein the determination whether to delay querying the teacher language model is based on one or more of an identification of the user or a current load for the teacher model.

6. The method as in claim 1, wherein the response comprises a chart or plot of a network generated by the first language model based on networking telemetry from that network.

7. The method as in claim 1, wherein the response comprises a command line interface (CLI) command for a networking element in a network.

8. The method as in claim 1, wherein the response comprises one or more of an analysis of a packet trace from a network or an application programming interface (API) query.

9. The method as in claim 1, wherein updating the first language model includes using the resolution to augment subsequent contexts provided to the first language model.

10. The method as in claim 1, wherein the first language model is configured to perform a monitoring or control action in a computer network.

11. An apparatus, comprising:

one or more network interfaces;

a processor coupled to the one or more network interfaces and configured to execute one or more processes; and a memory configured to store a process that is executable by the processor, the process when executed configured to:

generate a response to user input using a first language model;

determine that the response is an erroneous response;

make a determination whether to delay querying a teacher language model regarding the erroneous response until after handling of the user input has completed;

query, after handling of the user input has completed when the determination is to delay, the teacher language model based on the erroneous response in order to obtain a resolution to the erroneous response;

generate, based on an output from querying the teacher language model regarding the erroneous response, a resolution to the erroneous response including a corrected version of the erroneous response; and update the first language model using the resolution from the teacher language model.

12. The apparatus as in claim 11, wherein the process when executed is further configured to:

block the first language model from providing the erroneous response to a user interface associated with the user input.

13. The apparatus as in claim 11, wherein the apparatus determines that the response is an erroneous response by:

detecting a syntax error or incorrect parameter within the response.

14. The apparatus as in claim 11, wherein the apparatus generates the resolution to the erroneous response using the teacher language model by:

receiving feedback from an expert regarding the resolution.

15. The apparatus as in claim 11, wherein the teacher language model is larger in size than that of the first language model.

16. The apparatus as in claim 11, wherein the response comprises a chart or plot of a network generated by the first language model based on networking telemetry from that network.

17. The apparatus as in claim 11, wherein the response comprises a command line interface (CLI) command for a networking element in a network.

18. The apparatus as in claim 11, wherein the response comprises an analysis of a packet trace from a network.

19. The apparatus as in claim 11, wherein the response comprises an application programming interface (API) query.

20. A tangible, non-transitory, computer-readable medium storing program instructions that cause a device to execute a process comprising:

generating, by the device, a response to user input using a first language model;

determining, by the device, that the response is an erroneous response;

making, by the device, a determination whether to delay querying a teacher language model regarding the erroneous response until after handling of the user input has completed;

querying, by the device and after handling of the user input has completed when the determination is to delay, the teacher language model based on the erroneous response in order to obtain a resolution to the erroneous response;

generating, by the device and based on an output from querying the teacher language model regarding the erroneous response, a resolution to the erroneous response including a corrected version of the erroneous response; and updating, by the device, the first language model using the resolution from the teacher language model.

* * * * *